INVENTORS N. R. HALL
R. K. THOMPSON, JR.
BY E J Olinder
ATTORNEY

July 28, 1964 N. R. HALL ETAL 3,142,522

COIN TELEPHONE HOUSING

Filed Dec. 18, 1962 3 Sheets-Sheet 2

July 28, 1964 N. R. HALL ETAL 3,142,522

COIN TELEPHONE HOUSING

Filed Dec. 18, 1962 3 Sheets-Sheet 3

United States Patent Office 3,142,522
Patented July 28, 1964

3,142,522
COIN TELEPHONE HOUSING

Norris R. Hall and Richard K. Thompson, Jr., Indianapolis, Ind., assignors to Bell Telephone Laboratories, Incorporated, New York, N.Y., a corporation of New York Filed Dec. 18, 1962, Ser. No. 245,567
10 Claims. (Cl. 312—199)

This invention relates to coin operated telephones and more particularly to coin telephone housings and its general object is to enhance the security of such structures.

A substantial percentage of all coin telephone installations are located in relatively remote areas such as in highway telephone booths for example. Such installations typically experience a high incidence of fraudulent telephone operation, vandalism and theft. One form of fraudulent operation is the forcing of a wire or probing tool through an opened joint or aperture in the telephone housing in order to introduce a false ground which may result in telephone service being provided at no cost or at less cost than the required rate. Vandalism frequently involves a prying off of various parts of the telephone housing and often includes the detachment of the entire housing from its supporting structure. Incidents of theft normally center around the removal of the coin box, access being gained by prying open the protective vault, although occasionally the entire telephone instrument is removed.

Known structures and techniques may of course be employed to construct a virtually impregnable housing and thus provide the required degree of security. The cost of such an approach is prohibitively high, however. Accordingly, one specific object of the invention is to increase the security of coin telephone housings without a corresponding increase in cost.

Another object is to simplify the fabrication and assembly techniques employed in the manufacture of coin telephone housings.

A further object is to reduce the incidence of coin telephone fraudulent operation, vandalism and theft.

These and other objects are achieved in accordance with the principles of the invention in a coin telephone housing constructed from a unique combination of structural parts formed and interrelated to provide an exceedingly high degree of security without recourse to the use of expensive materials or to complexity of design. One illustrative embodiment of the invention employs three major housing members, namely, a rear housing, a lower housing and a front cover. A key aspect of the invention relates to the multifunction nature of the structural elements which are employed to interlock the three major members indicated. For example, each of a pair of metal brackets is secured to the inside front edge of a respective one of the vertical sides of the rear housing. Suitable apertures in the brackets accommodate the tabs of a pair of locking bolts which are uniquely mounted on the inside of the front cover. In addition to serving as strikes for the locking bolts, the brackets serve as positive stops governing the distance between the rear wall of the rear housing and the front wall of the front cover when these two units are in place.

In accordance with the invention each of a second pair of brackets is secured to the inside front edge of a respective one of the vertical sides of the front cover. These second brackets form one side of a set of grooves which extend between these brackets and the front cover, which grooves accommodate the tongue formed by the outer edge of the rear housing. Additionally, these second brackets serve as mounting plates for studs which guide the travel of the locking bolts. Still another function is served by the brackets indicated in that each increases the rigidity and strength of its respective supporting surface.

Another aspect of the invention concerns the employment of tongue and groove mating throughout the housing and more specifically in the multifunction nature of the elements which form the respective tongue and groove combinations. Thus, for example, a tongue formed by a horizontal bottom lip of the front cover is accommodated by a groove which is formed between integral extending bracket members of the vault top and the top edge of the lower housing. Similarly, an inwardly protruding lip of the vault door serves as a tongue which is accommodated by a continuous four-sided groove formed between integral extending portions of the vault liner and the sides of the vault doorway of the lower housing. Additionally, these integral extending portions of the vault liner serve as strikes for the locking bolts mounted on the inside of the vault door.

Still another aspect of the invention relates to the operation and mounting of the locking bolts of the front cover. The bolts are arranged to move upwardly or downwardly to the locked or unlocked position as a single unit by means of an associated U-shaped tie rod. Each end of the rod is pivotally affixed to a respective one of the bolts and the bottom of the U is pivotally secured by a suitable bracket mounted on the inside face of the front cover. This construction ensures operation of the locking bolts as a single unit at the cost of very little interior space. Other advantages of this type of construction include ruggedness, simplicity and reliability.

A further aspect of the invention concerns the operation of the locking bolts of the vault door. Each bolt is driven by the action of a respective cam slot in a cam disk member bearing against a respective stud that is affixed to each bolt. For smoothness of operation the cam slots are substantially arcuate. In the locked position, however, each stud rides against a relatively flat area or land in the cam slot which is adjacent to the arcuate portion of the slot. As a result, prying pressure exerted against the ends of the bolts does not tend to withdraw the bolts through rotation of the cam plate but instead only serves to drive the associated studs against the flat portion of the respective accommodating cam slot.

Accordingly, one feature of the invention lies in a coin telephone housing wherein all critical pry points are protected by the employment of tongue and groove construction and wherein multipurpose elements are employed to form the tongue and groove combinations.

Another feature of the invention pertains to a double locking bar arrangement for securing the front cover of a coin telephone housing to the rear housing, the locking bars being operated together as a single unit by means of a pivotally mounted U-shaped tie rod.

A further feature concerns a cam slot drive arrangement for the locking bolts of a coin telephone housing vault door wherein the generally arcuate configuration of the cam slots is terminated by a substantially flat portion or land thereby avoiding any tendency for the mechanism to unlock in response to prying pressure exerted on the locking bolts.

Still another feature of the invention involves a coin telephone housing vault door locking arrangement which requires the lock to be in the locked position before the withdrawal of the key is permitted and which precludes proper positioning of the vault door unless the lock is in the unlocked position, thereby reducing the possibility of having the vault door left unlocked by either inadvertence or fraud. A similar feature is employed in the front cover locking arrangement.

These and other objects and features will be fully apprehended from the following detailed description of an illustrative embodiment of the invention and from the drawing in which.

Figure 1:
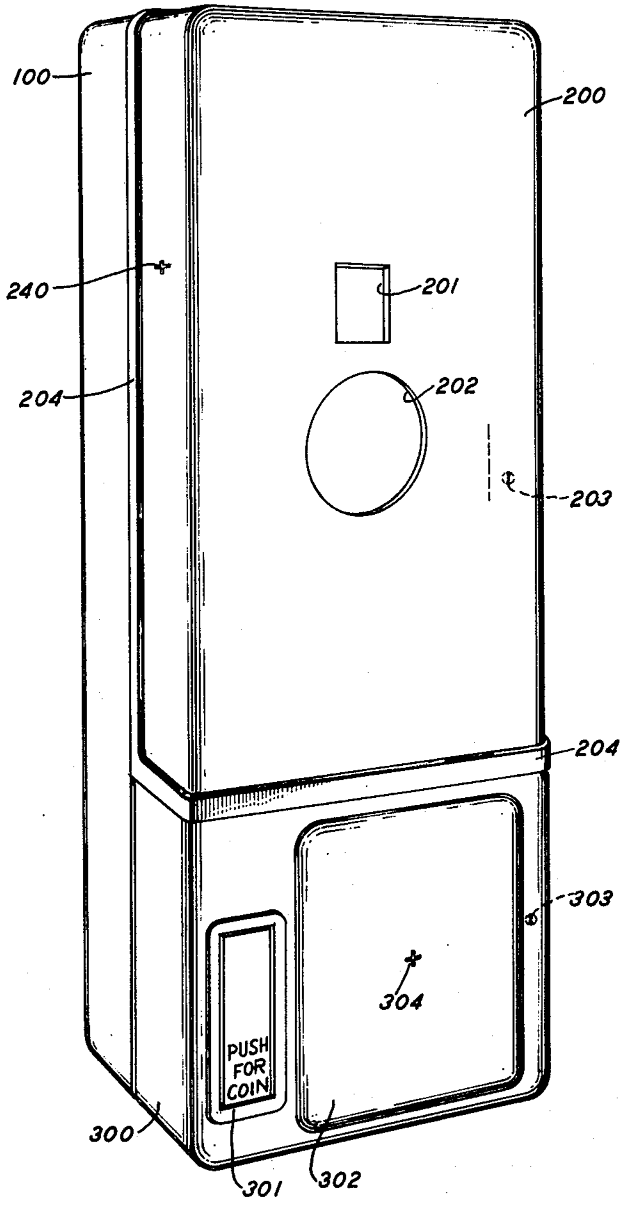
FIG. 1 is a front perspective view of a coin telephone housing in accordance with the invention.
Figure 2:
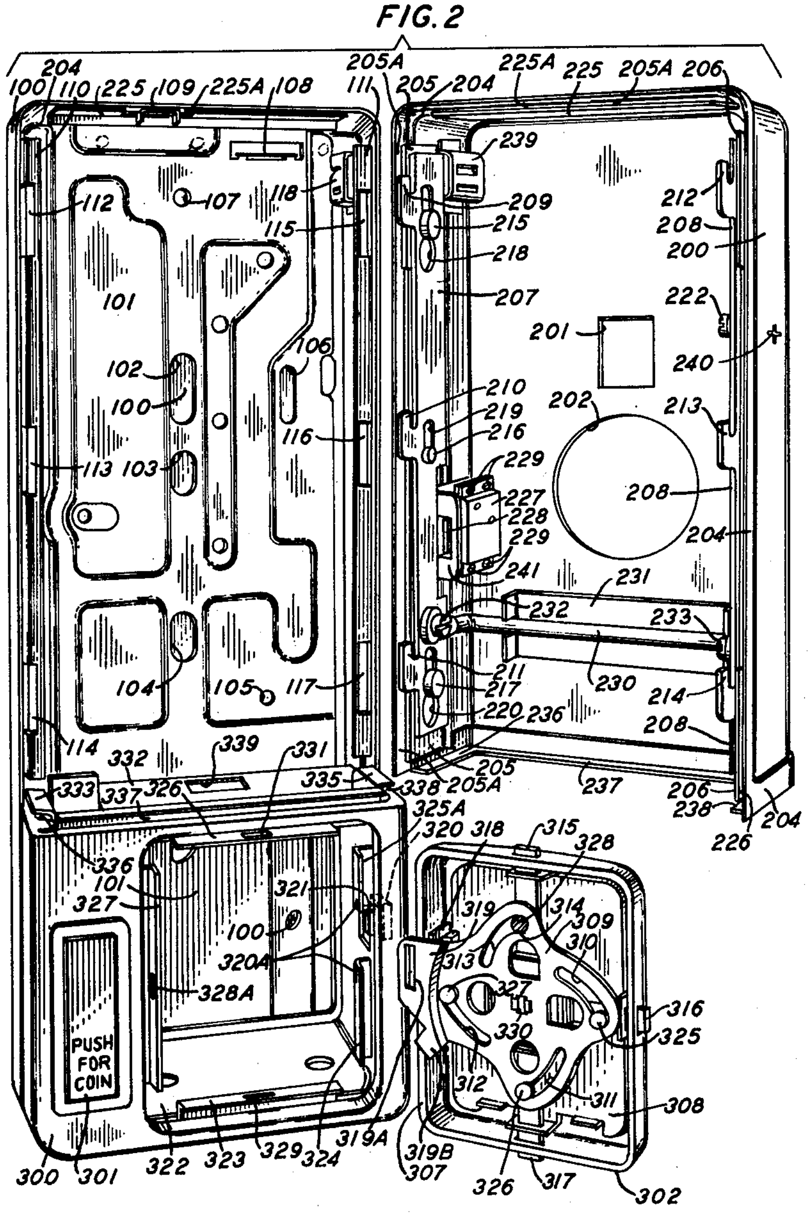
FIG. 2 is a front perspective view of a coin telephone housing in accordance with the invention with the interiors of the rear housing, vault door and front cover exposed to view.

In FIG. 1 it can be seen that a coin telephone housing in accordance with the invention is comprised of three major elements, namely, a rear housing 100, a lower housing 300, and a front cover 200. The rear housing 100 extends from the top to the bottom of the entire enclosure and extends approximately one-half way toward the front. The front cover 200 includes a raised bead member 204 which extends around all of the open edges of the cover. Front cover 200 also includes apertures 201 and 202 for mounting the telephone switchhook and dial (not shown). Aperture 240 provides access for the insertion of a tool (not shown) which operates the front cover locking mechanism. Aperture 203 is a keyhole for the front cover key lock 227 (FIG. 2). Lower housing 300 provides a means for mounting door 301 of the coin return chute and also provides a doorway for vault door 302. Aperture 304 is provided to accommodate a tool (not shown) which is employed to operate the vault door locking mechanism. Aperture 303 is a keyhole for the vault door key lock 320 (FIG. 2).

FIG. 2 shows the coin telephone housing unit with front cover 200 and vault door 302 opened which serves to expose the interiors of the upper housing and a vault enclosure which takes up the majority of the space inside lower housing 300. Rear housing 100 includes a left locking bar bracket 110 which is formed into a longitudinal right-angled bend having one side thereof suitably affixed, as by welding for example, to the inside front edge of rear housing 100. A similar right locking bar bracket 111 is secured to the inner right edge of rear housing 100. Left locking bar bracket 110 includes strike apertures 112, 113, and 114 which are designed to accommodate tabs 212, 213, and 214 of locking bar 208 and strike apertures 115, 116, and 117 of right locking bar bracket 111 accommodate tabs 208, 210, and 211 of a locking bar 207. Locking bar brackets 110 and 111, being affixed to the respective edges of rear housing 100, provide a significant increase in the strength and stiffness of these edges.

The inside back portion of rear housing 100 is substantially covered by a back plate 101 which is affixed thereto, by suitable welds, for example. Back plate 101 is formed in a pattern of various grooves and ridges which are designed to facilitate the proper positioning of the coin telephone. Both back plate 101 and the inside back portion of rear housing 100 are advantageously constructed of relatively thin material to simplify forming, but when welded together, these plates form a rigid member having stiffness characteristics of very heavy material. Apertures 102, 103, 104, 106, and 107 are provided to accommodate fasteners such as screws or bolts (not shown) which may be employed to secure the unit to a supporting structure. Brackets 108 and 109 provide additional means for securing certain elements of the coin telephone mechanism. Bracket 118 is a form of slotted cover which is mounted over small slots (not shown) in the side of rear housing 100. The rear housing and cover slots permit sound radiations from the telephone bell (not shown) to escape from the housing enclosure. Bracket 118 prevents any wire or probing tool which may be inserted into the housing slots from reaching any portion of the coin telephone mechanism or circuitry, thus preventing the introduction of false grounds. A similar bracket 239 is installed for the same purpose on the inside of front cover 200.

Front cover 200 includes a pair of substantially flat bracket members 205 and 206 each suitably affixed, as by welding for example, to a respective inside edge of the cover. A similar bracket 225 is affixed to the inside edge of the top of front cover 200. A groove 205A formed between bracket 205 and raised bead 204 is designed to accommodate the right front edge of rear housing 100 in a tongue and groove type of mating. Similar tongue and groove mating is provided between the top inner edge of rear housing 100 and groove 225A which is bounded by bracket 225 and bead 204. Tongue and groove mating is also provided between the left front edge of rear housing 100 and groove 226 which is bounded by bracket 206 and bead 204. When front cover 200 is positioned over rear cover 100 and the tongue and groove matings described above are completed, the distance between rear housing 100 and front cover 200 is rigidly fixed by virtue of bracket 205 bearing against locking bar bracket 110 and bracket 206 bearing against locking bar bracket 110.

Figure 3:
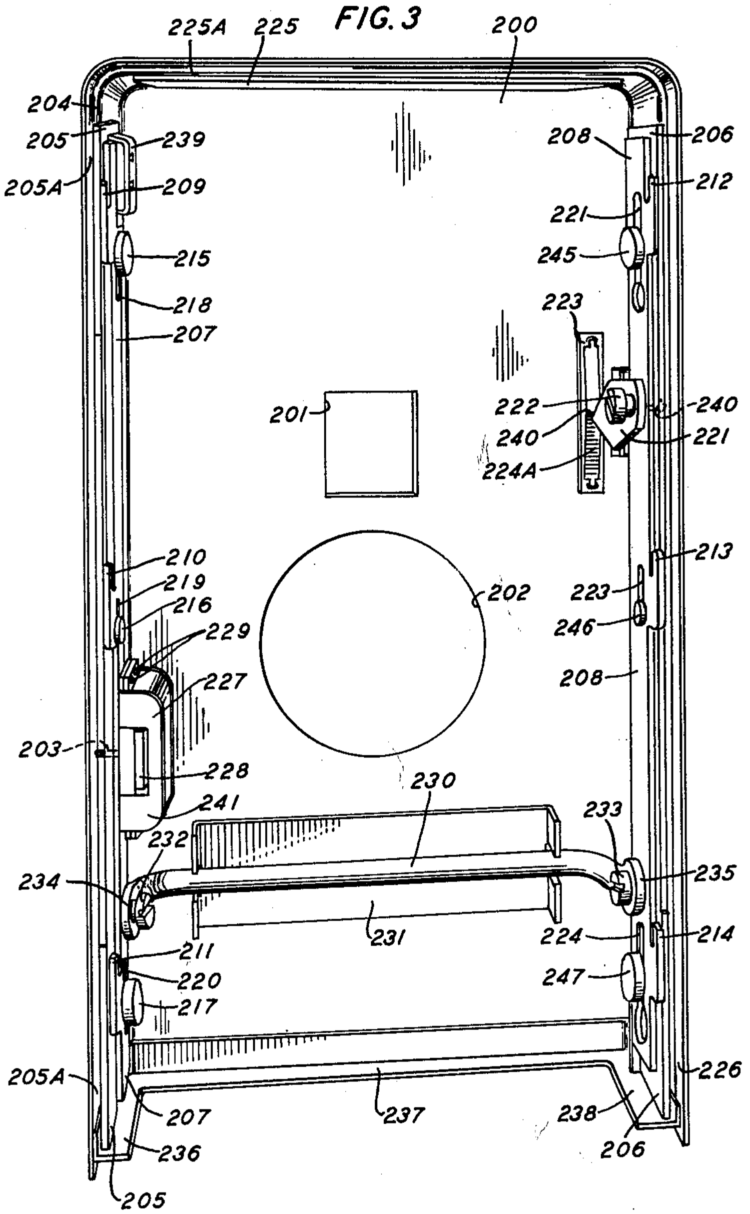
FIG. 3 is a detailed view of the front cover shown in FIG. 2.

A detailed description of the locking mechanism of front cover 200 is best made with reference to FIG. 3. Locking bar 207 which includes stud slots 218, 219, and 220 is mounted for vertical sliding movement by studs 215, 216, and 217. Similarly, locking bar 208, which includes stud slots 221, 223, and 224 is mounted for vertical sliding movement by studs 245, 246, and 247. Studs 215, 216, 217, 245, 246, and 247 are suitably affixed to brackets 205 and 206, respectively, which in turn are affixed to the respective inner edges of front cover 200. In FIG. 3 locking bars 207 and 208 are shown in their upper or locked position, which position prevents the meshing of locking bar tabs 209, 210, and 211 with strike apertures 115, 116, and 117 (shown in FIG. 2) and similarly prevents the meshing of locking bar tabs 212, 213, and 214 with strike apertures 112, 113, and 114 (shown in FIG. 2). Locking bars 207 and 208 are lowered to the unlocked position by means of a suitable tool (not shown) inserted in aperture 240. Rotation of the tool is employed to engage locking bar positioning link stud 222 for rotational movement. Rotational movement of stud 222 is translated by means of a conventional linkage (not shown) into rotational movement of locking bar positioning link 221. The inner point of locking bar positioning link 221 is thus forced to ride over peak 240 of spring member 224A which is positioned by securing bracket 223. The function of spring 224A is to ensure that locking bars 207 and 208 are permitted only two possible positions, i.e., either fully locked or fully unlocked, thus reducing the possibility of mounting front cover 200 on rear housing 100 in a cocked or partially cocked position.

The movement of locking bar positioning link 221 imparts a downward force on locking bar 208. This downward force is coupled to locking bar 207 through a U-shaped tie rod 230 which is pivotally mounted on locking bar 207 and on locking bar 208 by means of studs 232 and 233, respectively. Tie rod 230 is held in place, although free for rotation, by means of bracket 231, which is secured to the inside of front cover 200. As a result of the coupling action of tie rod 230, locking bars 207 and 208 are rigidly held together and operate as a unitary structure. The U-shaped configuration of tie rod 230 results in a minimal use of interior housing space.

A conventional key operated lock 227 is secured to the right inner side of front cover 200 by means of mounting screws 229. Lock 227 is advantageously of the type which precludes the removal of its key (not shown) when bolt 228 is in its unlocked or retracted position. In accordance with one of the features of the invention, lock bolt 228 is aligned for proper mating with strike 241 only if locking bars 207 and 208 are in the locked position. Thus, it is impossible to have front cover 200 improperly mated with rear housing 100, or properly mated but unlocked, without these conditions being obvious. Specifically, if lock 227 is unlocked, the key must be left in keyhole 203. If locking bars 207 and 208 are in the lower or unlocked position, and left in that position after tongue and groove mating with rear housing 100, bolt 228 of lock 227 cannot be thrown to the locked position and its key must be left in keyhole 203. If locking bars 207 and 208 are in their upper or locked position prior to mating front cover 200 with rear housing 100, front cover 200 will be in an obviously cocked, unseated position. Thus, in a locking arrangement in accordance with the invention, if front cover 100 is left in an improperly secured condition, either by inadvertence or design, this condition is made plainly evident from the most casual inspection.

With reference now to FIG. 2, the vault liner 322 is comprised of a substantially U-shaped member of heavy plate material which forms the bottom and the two sides of the vault. The vault is designed to house a coin box (not shown) which serves as the receptacle for collected coins. Vault liner 322 is secured to the rear of rear housing 100 through back plate 101. This is accomplished advantageously by mating small tabs (not shown) on the rear edge of vault liner 322 with corresponding apertures (not shown) in back plate 101 and then by welding the mated elements. A vault cover member 332 is secured across the top of vault liner 322, by welding for example. Bracket members 333 and 335, which are welded to vault top 332 and vault liner 322, provide the upper boundary for groove 336 and 338, the lower boundary being provided by the top of lower housing 300. Flange, or bracket 335 which is integral with vault top 332, provides the upper boundary of groove 337, the lower boundary being provided by the top of lower housing 300. Grooves 336, 337, and 338 mate with horizontal tongues 238, 237, and 236, respectively, to provide tongue and groove interlocking between the bottom edges of front cover 200 and lower housing 300. As a result all edges of front cover 200 are protected by tongue and groove interlocking.

Vault cover 302 is formed with an inwardly extending continuous tongue member 307 which is designed to mate in tongue and groove fashion with the grooves formed between the doorway of lower housing 300 and brackets 323, 324, 325A, 326, and 327. Brackets 323, 324, 325A, and 327 are integral with vault liner 322 and bracket 326 is integral with vault top 332. A vault door locking mechanism is comprised of cam plate 309 and bolts 315, 316, 317, and 318 together with mounting plate 308. As shown, bolts 315, 316, 317, and 318 are in their locked position. Unlocking is achieved by means of a suitable tool (not shown) inserted through an aperture (not shown) in vault door 308 to engage axis pin 330 whereby cam plate 309 may be rotated. The rotation of cam plate 309 is translated by means of cam slots 313, 310, 311, and 312 into an inwardly acting force on studs 328, 325, 326, and 327 which studs are affixed to bolts 315, 316, 317, and 318, respectively. Bolts 315, 316, 317, and 318 are accordingly withdrawn from their respective strikes 331, 328A, 329, and 320A. Rotation of cam plate 309 also serves to rotate strike plate 319, which is integral with cam plate 309, provided of course that bolt 321 of conventional key lock 320 has been withdrawn from strike aperture 319A. As shown, lock 320 is affixed to the inner right side of vault liner 322.

In accordance with the invention, tab 319B on strike plate 319 prevents lock 320 from being locked if cam plate 309 is in the unlocked position. In the unlocked position of cam plate 309, tab 319B is directly in front of lock bolt 321 thereby preventing movement of the lock bolt in the locking direction. Lock 320 is designed, in accordance with the invention, to be of a type similar to lock 227; specifically, lock 320 is of a type which precludes key removal from the lock unless the lock is in the operated or locked position. Thus, in accordance with the invention and as in the case of front cover 200 described above, it is impossible to leave vault door 302 in an unlocked or improperly locked condition without such condition being obvious since either the key of lock 320 will be in place or vault door 302 will be in a cocked position.

As shown, cam slots 310, 311, 312, and 313 are substantially arcuate to provide for smoothness in operation of the locking mechanism. Stud 328 has been shown in cross section with the stud head removed to reveal the unique configuration of the upper portion of cam slot 313. The inner side of the upper portion of cam slot 313 is formed into a relatively flat portion or land 314. Cam slots 310, 311, and 312 are similarly formed although in each case the related land contour is hidden from view by a respective one of the studs 325, 326, and 327. In the event that an inward prying force is exerted on the end of a bolt such as 315 for example, such force is transmitted through stud 328 and thence to the surface of land 314. As a result, no rotational force is imparted to cam disk 309. Were it not for such construction, a prying force on a bolt such as 315 would necessarily tend to impart a rotational motion to cam plate 309 and the entire stress would be placed on bolt 321 of lock 320. Instead, the stress of such force is borne, in accordance with the invention, by stud 328, by bolt 315 and by the cam plate itself.

It is to be understood that the embodiment described herein is merely illustrative of the principles of the invention and that a wide variety of modifications thereto may be effected by persons skilled in the art without departing from the spirit and scope of the invention.

What is claimed is:

1. A housing assembly for a coin telephone comprising, in combination, a rear housing member, a lower housing member and a front cover, said front cover including a first plurality of exposed edges serving as a first set of tongue members and a second plurality of exposed edges serving as one side of a second set of grooves, dual purpose means limiting the depth of said assembly between the rear portion of said rear housing and the front portion of said front cover and serving as the second side of said second set of grooves, said rear housing including a third plurality of exposed edges serving as a second set of tongue members engageable with said second grooves, a vault, including a vault top, mounted in said lower housing, said vault top including integral lip members extending over the top edges of said lower housing and forming therebetween a first set of grooves accommodating said first set of tongue members, means for locking said front cover to said rear housing member operable after the engagement of said second set of tongue members by said second set of grooves, a vault door member including a continuous protruding lip, a vault doorway aperture in said lower housing, and means integral with said vault forming a continuous groove between said last named means and the periphery of said aperture for accommodating said protruding lip in tongue and groove fashion.

2. A housing assembly for a coin telephone comprising, in combination, a rear housing member, a lower housing member and a front cover; said front cover including a first plurality of exposed edges serving as a first set of tongue members and a second set of exposed edges serving as one side of a second set of grooves; dual purpose means limiting the depth of said assembly between the rear portion of said rear housing and the front portion of said cover and defining the second side of said second set of grooves; said rear housing including a third set of exposed edges serving as a three sided second set of tongue members engageable in tongue and groove fashion with said second set of grooves; a vault, including a vault top, vault bottom and vault sides, said vault being substantially housed within said lower housing and the lower portion of said rear housing, said vault top including integral bracket portions extending over the top portion of said lower housing and forming therebetween a first set of grooves accommodating said first set of tongue members; means for securing said front cover to said rear housing operable only after the mating of said first tongue members with said first grooves and after the mating of said second tongue members with said second grooves; and means for locking said securing means operable only after the operation of said securing means to a secured position.

3. Apparatus in accordance with claim 2 wherein said securing means includes a pair of locking bar members each mounted for vertical movement in a plane parallel to but in spaced relation to a respective inner side of said front cover, each of said locking bars including at least one protruding tab member, said rear housing including a pair of strike brackets each affixed to a respective inner edge of said rear housing substantially strengthening and stiffening said last named inner edge thereby, said strike brackets bearing against said dual purpose means when said front cover and rear housing are in assembled relation, each of said strike brackets having a respective aperture accommodating a respective one of said tab members, means for moving said locking bars vertically as a unitary structure thereby to shift the position of said bars from an unsecured to a secured position, said locking means including a lock having a bolt engageable with a strike which is integral with one of said locking bars, engagement of said bolt with said strike being possible only when said locking bars are in said secured position.

4. Apparatus in accordance with claim 3 including means restricting the rest positions of said locking bars to said secured or unsecured positions thereby precluding the partial mating of said front cover to said rear housing.

5. Apparatus in accordance with claim 4 wherein said restricting means comprises a spring member affixed to the rear portion of said rear housing and a link member affixed to one of said locking bars, said link member being forced against said spring member by movement of said locking bar whereupon said spring member urges said link member, and hence the associated one of said locking bars, to one of said rest positions.

6. A housing assembly for a coin telephone comprising, in combination, a rear housing member, a lower housing member and a front cover, means for mating said rear housing and said front cover in tongue and groove fashion, edges of said rear housing serving as a first set of tongues for said mating, means for mating said front cover and said lower housing in tongue and groove fashion, edges of said front cover serving as a second set of tongues for said last named mating, a vault enclosure housed substantially within the lower portion of said rear housing and said lower housing, a vault door having a face, a continuous border of said face being formed into an inwardly protruding tongue, said lower housing including a doorway for accommodating said door, said vault including a plurality of integral bracket members forming with the sides of said doorway a set of grooves for mating with said protruding tongue in tongue and groove fashion; means for securing said door to said bracket members comprising a plurality of bolts each having a respective stud member affixed thereto, a rotatable cam plate having a plurality of substantially arcuate cam slots each accommodating a respective one of said studs whereby upon the rotation of said plate said bolts are driven outwardly to a securing position, each of said slots having a substantially flat portion or land at one end thereof corresponding to the position of its respective stud and bolt when said bolt is in said securing position thereby ensuring against the translation of any inward prying force, exerted against the end of one of said bolts, into rotational movement of said cam plate.

7. Apparatus in accordance with claim 6 including means for locking said bolts and said cam plate in said securing position, each of said bracket members including a strike aperture for accommodating a respective one of said bolts.

8. Apparatus in accordance with claim 7 wherein said locking means comprises a lock having a bolt, said cam plate including a strike aperture accommodating said bolt.

9. Apparatus in accordance with claim 8 including means responsive to the rotation of said cam plate away from said securing position for preventing the movement of said bolt of said lock from an unlocked to a locked position thereby precluding the positioning of said vault door in a partially secured position.

10. A housing assembly for a coin telephone comprising, in combination, a rear housing, a front cover and a lower housing, means for mating said front cover with said rear housing in tongue and groove fashion, means for mating said front cover and said lower housing in tongue and groove fashion, a pair of locking bars each mounted for vertical movement on a respective inside vertical edge of said front cover, each of said locking bars including at least one locking tab, a substantially U-shaped tie rod having each end thereof pivotally mounted on one end of a respective one of said locking bars, the mid-portion of said rod being supported for rotational movement by the rear portion of said front cover, said rear housing including a pair of strike brackets each affixed to a respective inner vertical edge of said rear housing, each of said strike brackets including a strike aperture for accommodating a respective one of said tabs, means operative after the engagement of both of said mating means for vertically moving one of said locking bars whereupon through the coupling action of said tie rod both of said locking bars are moved vertically as an integral unit, whereby said tabs are shifted into an interlocking relation with said strike apertures.

References Cited in the file of this patent

UNITED STATES PATENTS

| | | |
|---|---|---|
| 2,738,049 | Shepherd | Mar. 13, 1956 |
| 2,743,039 | Smith | Apr. 24, 1956 |
| 2,757,060 | Shepherd | July 31, 1956 |